(12) United States Patent
Grover et al.

(10) Patent No.: US 8,356,975 B2
(45) Date of Patent: Jan. 22, 2013

(54) GAS TURBINE ENGINE WITH NON-AXISYMMETRIC SURFACE CONTOURED VANE PLATFORM

(75) Inventors: Eric A. Grover, Tolland, CT (US); Thomas J. Praisner, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 236 days.

(21) Appl. No.: 12/730,191

(22) Filed: Mar. 23, 2010

(65) Prior Publication Data
US 2011/0236200 A1    Sep. 29, 2011

(51) Int. Cl.
- F04D 29/44    (2006.01)
- F04D 29/54    (2006.01)
- F03B 1/00    (2006.01)
- F03B 11/02    (2006.01)
- F03D 5/00    (2006.01)

(52) U.S. Cl. ................................ 415/191; 415/211.2

(58) Field of Classification Search .............. 415/191, 415/211.2, 199.5, 173.1, 173.5, 116
See application file for complete search history.

(56) References Cited

U.S. PATENT DOCUMENTS

| | | | |
|---|---|---|---|
| 2,918,254 A | 12/1959 | Hausammann | |
| 3,014,695 A * | 12/1961 | Rankin et al. | 416/220 R |
| 4,218,178 A | 8/1980 | Irwin | |
| 4,271,005 A | 6/1981 | Wright et al. | |
| 4,283,822 A * | 8/1981 | Muth et al. | 29/889.722 |
| 4,420,288 A | 12/1983 | Bischoff | |
| 4,677,828 A | 7/1987 | Matthews et al. | |
| 5,044,885 A | 9/1991 | Odoul et al. | |
| 5,397,215 A | 3/1995 | Spear et al. | |
| 5,466,123 A | 11/1995 | Rose | |
| 5,601,404 A | 2/1997 | Collins | |
| 6,213,711 B1 * | 4/2001 | Muller et al. | 415/191 |
| 6,217,282 B1 | 4/2001 | Stanka | |
| 6,276,432 B1 | 8/2001 | Thompson et al. | |
| 6,343,912 B1 | 2/2002 | Manteiga et al. | |
| 6,413,045 B1 | 7/2002 | Dancer et al. | |
| 6,430,917 B1 | 8/2002 | Platts | |
| 6,431,820 B1 | 8/2002 | Beacock et al. | |
| 6,471,474 B1 | 10/2002 | Mielke et al. | |
| 6,510,889 B2 | 1/2003 | Thompson et al. | |
| 6,511,294 B1 | 1/2003 | Mielke et al. | |
| 6,514,041 B1 | 2/2003 | Matheny et al. | |
| 6,592,326 B2 | 7/2003 | Marx et al. | |
| 6,609,880 B2 * | 8/2003 | Powis et al. | 415/1 |

(Continued)

FOREIGN PATENT DOCUMENTS
EP    2169183    3/2010

OTHER PUBLICATIONS

European Search Report dated Aug. 9, 2011; Ep Pat. No./App. No. 11250268.7-2321.

*Primary Examiner* — Christopher Verdier
*Assistant Examiner* — Su Htay
(74) *Attorney, Agent, or Firm* — Carlson, Gaskey & Olds PC

(57) ABSTRACT

A vane segment for a gas turbine engine according to an exemplary aspect of the present disclosure includes an inner vane platform relative an axis, the inner vane platform having a non-axisymmetric surface contour.

18 Claims, 9 Drawing Sheets

U.S. PATENT DOCUMENTS

| | | | |
|---|---|---|---|
| 6,632,070 B1 | 10/2003 | Tiemann | |
| 6,641,360 B2 | 11/2003 | Beeck et al. | |
| 6,669,445 B2 | 12/2003 | Staubach et al. | |
| 6,672,832 B2 | 1/2004 | Leeke et al. | |
| 6,709,233 B2 | 3/2004 | Haller | |
| 6,761,536 B1 | 7/2004 | Bash et al. | |
| 6,821,087 B2 * | 11/2004 | Matsumoto et al. | 415/191 |
| 6,837,679 B2 | 1/2005 | Kawarada et al. | |
| 6,887,040 B2 | 5/2005 | Tiemann et al. | |
| 6,923,620 B2 | 8/2005 | Tiemann | |
| 6,991,428 B2 | 1/2006 | Crane | |
| 7,044,718 B1 | 5/2006 | Platts | |
| 7,059,835 B2 | 6/2006 | Tiemann | |
| 7,134,842 B2 | 11/2006 | Tam et al. | |
| 7,300,253 B2 | 11/2007 | Beeck et al. | |
| 7,384,243 B2 | 6/2008 | Noshi | |
| 7,452,184 B2 | 11/2008 | Durocher et al. | |
| 7,465,155 B2 | 12/2008 | Nguyen | |
| 7,467,922 B2 | 12/2008 | Beeck et al. | |
| 7,467,924 B2 | 12/2008 | Charbonneau et al. | |
| 7,481,614 B2 | 1/2009 | Tomita et al. | |
| 7,484,936 B2 | 2/2009 | Bouchard et al. | |
| 7,497,663 B2 | 3/2009 | McRae, Jr. et al. | |
| 7,540,709 B1 | 6/2009 | Ebert | |
| 7,581,930 B2 | 9/2009 | Aggarwala et al. | |
| 7,597,536 B1 | 10/2009 | Liang | |
| 7,600,972 B2 | 10/2009 | Benjamin et al. | |
| 7,607,889 B2 | 10/2009 | Baldauf et al. | |
| 7,625,172 B2 | 12/2009 | Walz et al. | |
| 7,628,578 B2 | 12/2009 | Barnet et al. | |
| 2006/0245715 A1 * | 11/2006 | Matsumoto et al. | 385/147 |
| 2007/0020102 A1 | 1/2007 | Beeck | |
| 2007/0224043 A1 | 9/2007 | Blatchford | |
| 2008/0267771 A1 * | 10/2008 | Beeck et al. | 415/191 |
| 2010/0080708 A1 | 4/2010 | Gupta | |

\* cited by examiner

GAS TURBINE ENGINE WITH NON-AXISYMMETRIC SURFACE CONTOURED VANE PLATFORM

BACKGROUND

The present disclosure relates to a gas turbine engine, and more particularly to a reduction in purge air.

The core engine of a gas turbine engine typically includes a multistage axial compressor, a combustor and a high pressure turbine nozzle with one or more stages. Typical turbine nozzles, such as high pressure and low pressure turbine nozzles, define annular rings located adjacent to each turbine blade row to define axially alternate annular arrays of stator vanes and rotor blades.

To ensure that the rotatable blades and the static vane components do not contact each other under normal operating conditions, an annular gap is provided between the stator vanes and the bladed rotor. This requires, however, that the hot gases which pass through the turbine do not leak through the annular gap. Such leakage may result in a loss in turbine efficiency.

The conventional method to minimize hot gas leakage is the supply of high pressure purge air into the gap between the stator vanes and the bladed rotor. The purge air is directed radially outwardly over the surface of the rotatable disc and adjacent vane platform structure to exhaust through the gap into the core gas path. This minimizes hot gasses entrance into under-platform regions. These purge flows may cause some aerodynamic losses.

SUMMARY

A vane segment for a gas turbine engine according to an exemplary aspect of the present disclosure includes an inner vane platform relative an axis, the inner vane platform having a non-axisymmetric surface contour.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a schematic view of an inner vane platform with an axial non-axisymmetric surface contour on an;

DETAILED DESCRIPTION

Figure 1:
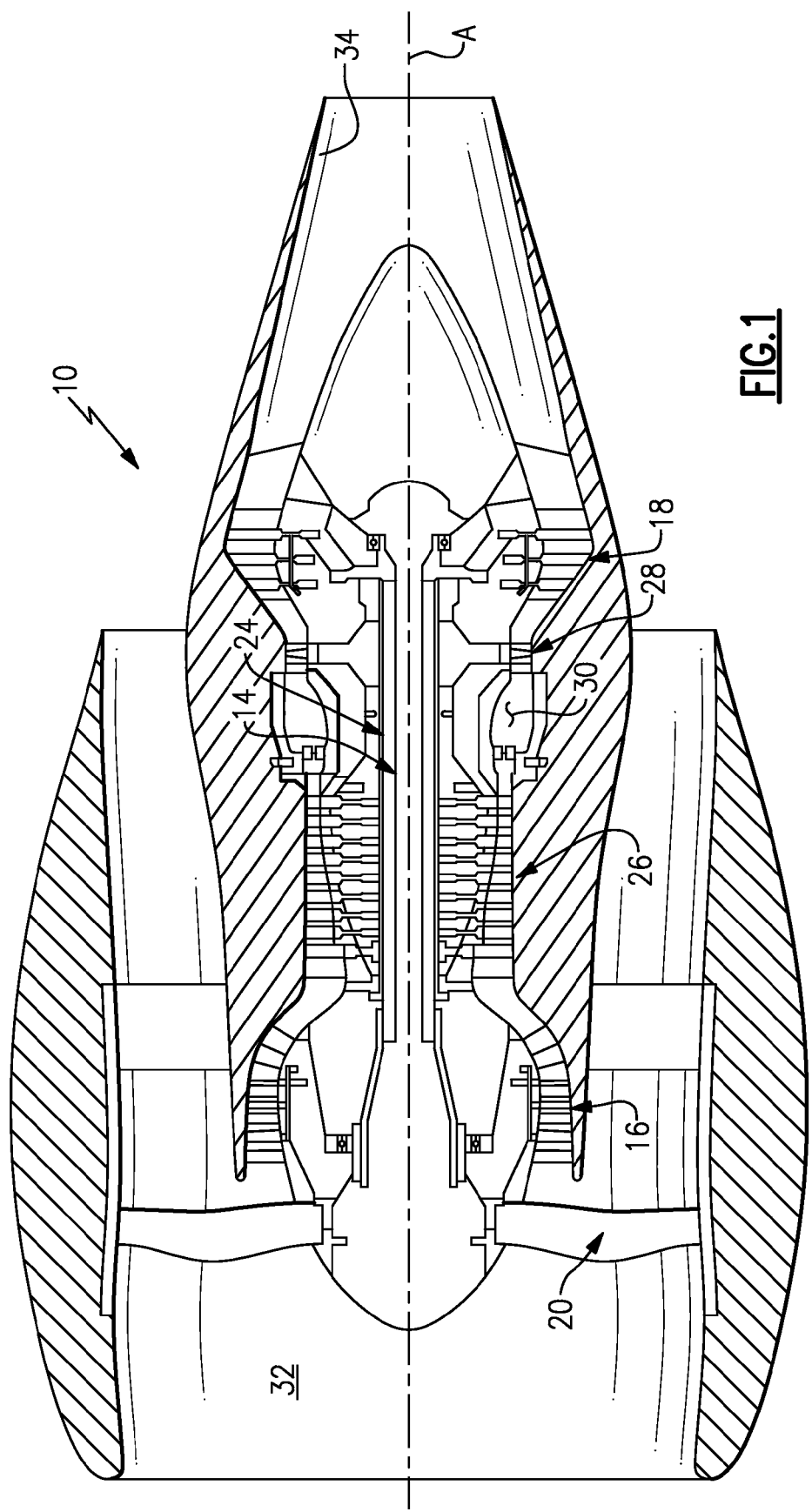
FIG. 1 is a general perspective view an exemplary gas turbine engine embodiment for use with the present disclosure.

FIG. 1 illustrates a general schematic view of a gas turbine engine 10 such as a gas turbine engine for propulsion. While a particular turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor section 30 is arranged between the high pressure compressor 26 and high pressure turbine 28. The low and high spools 14, 24 rotate about an engine axis of rotation A.

The gas turbine engine 10 functions in the conventional manner. Air drawn through an intake 32 is accelerated by the fan section 20 and divided along a bypass flow path and a core flow path. The bypass flow path bypasses the core engine section and is exhausted to atmosphere to provide propulsive thrust. The core flow path compresses the air in the compressor 16, 26, mixed with fuel and combusted in the combustor section 30. The resultant hot combustion products then expand through, and thereby drive the turbines 18, 28 before being exhausted to atmosphere through an exhaust nozzle 34 to provide additional propulsive thrust. The turbines 18, 28, in response to the expansion, drive the compressors 16, 26 and fan section 20.

Figure 2:
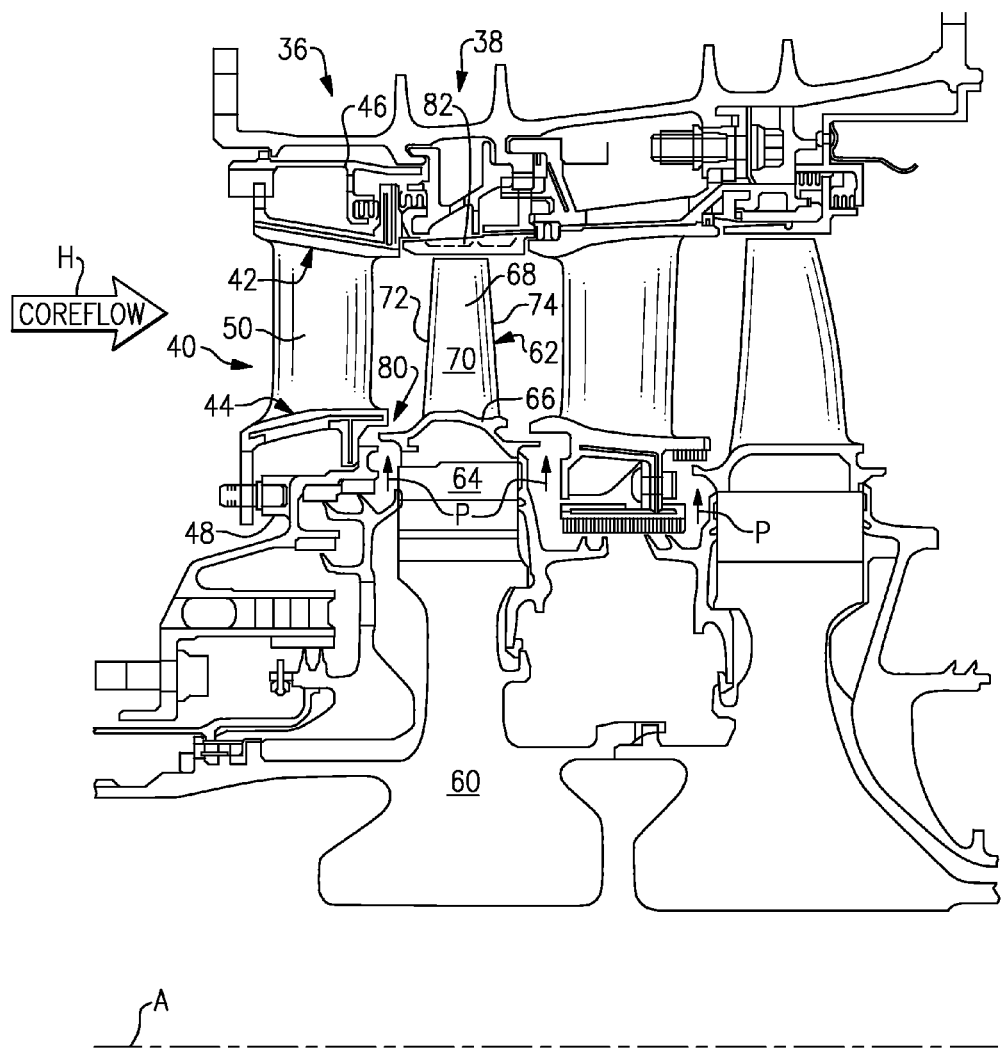
FIG. 2 is an expanded sectional view of a turbine section of the gas turbine engine.

Referring to FIG. 2, a stator portion 36 and a rotor portion 38 define a stage of the turbine section 18, 28. In the illustrated embodiment and for purposes of a detailed example, a single stage with the stator 36 and the rotor 38 will be described herein as being disposed within a turbine section. It should be understood, however, that this application is not limited to the turbine sectional alone and may be utilized within other sections such as the fan section and compressor section as well as every stage within each section.

That stator portion 36 includes an outer vane platform 42 and an inner vane platform 44 radially spaced apart from each other. The arcuate outer vane platform 42 may form a portion of an outer core engine structure 46 and the arcuate inner vane platform 44 may form a portion of an inner core engine structure 48 to at least partially define an annular turbine nozzle core gas flow path.

Figure 3:
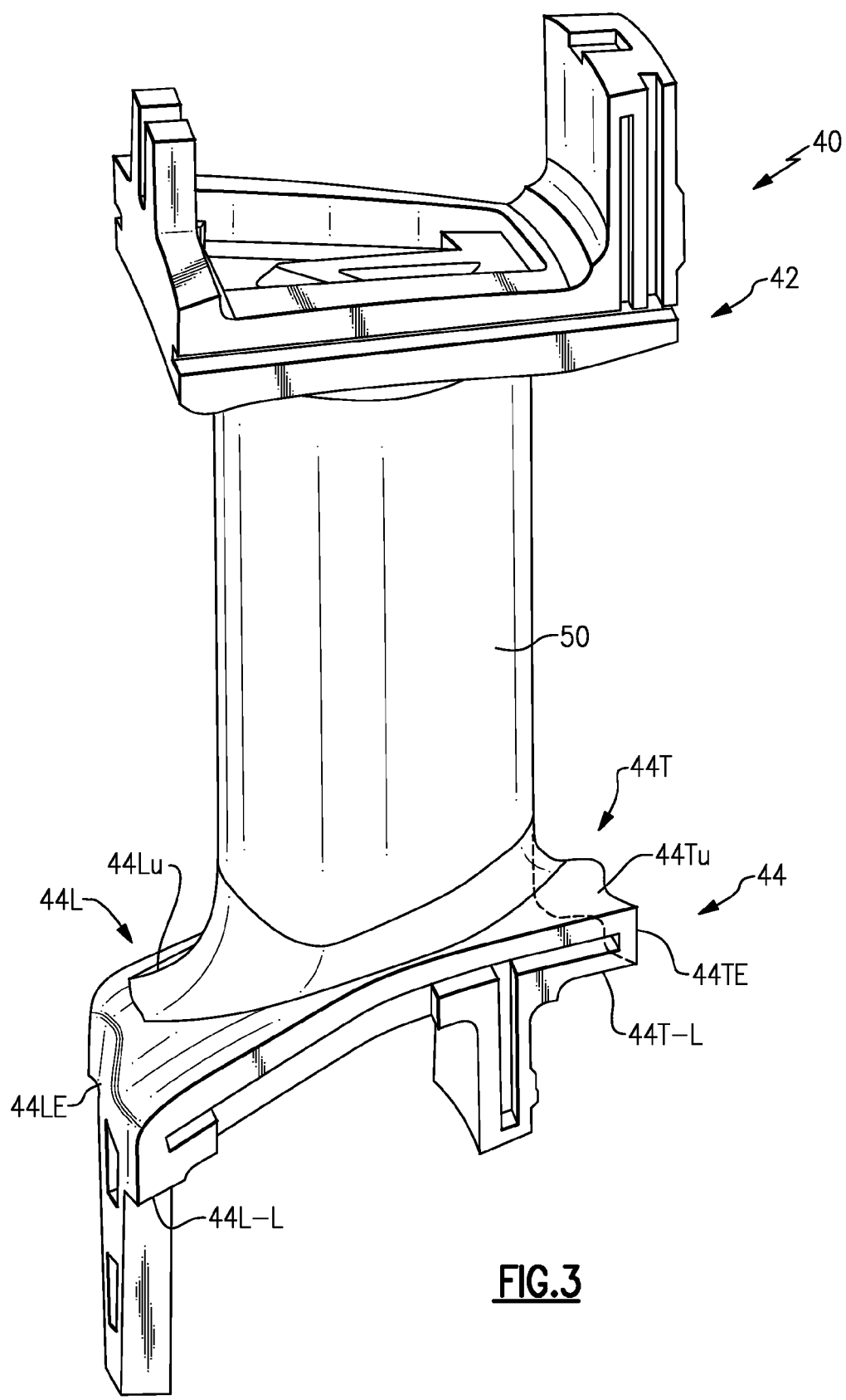
FIG. 3 is an expanded perspective view of a turbine stator vane segment.
Figure 4:
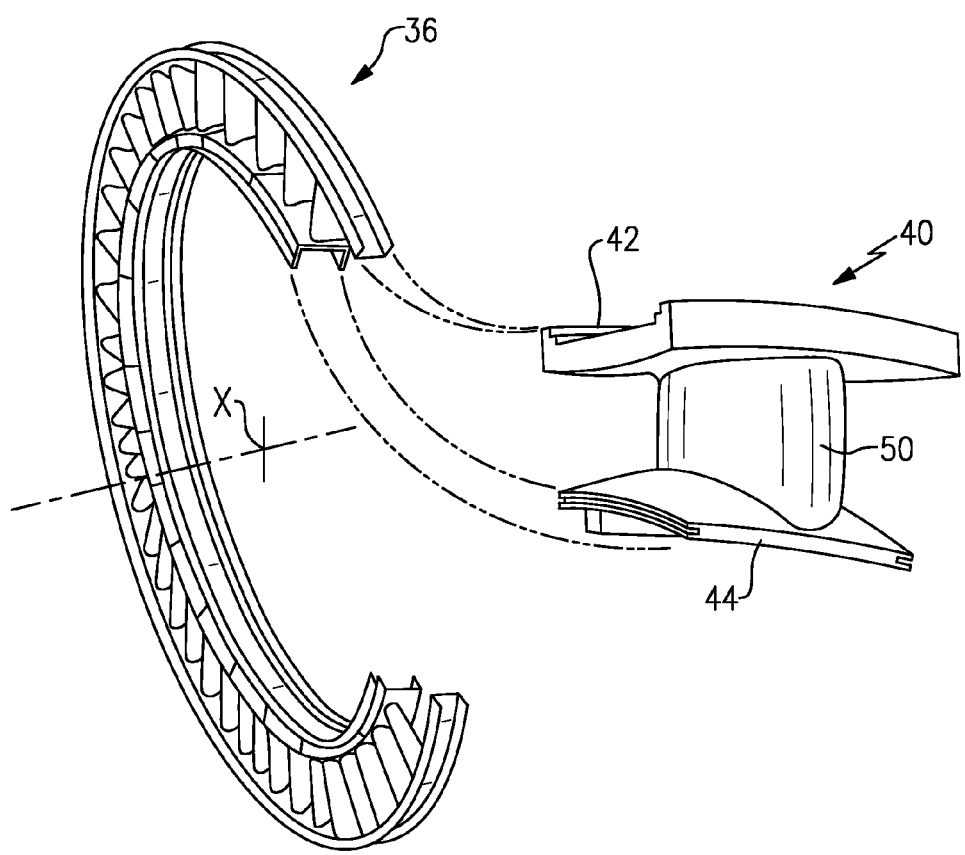
FIG. 4 is an expanded view of a stator vane portion of one turbine stage within a turbine section of the gas turbine engine.

Each circumferentially adjacent vane platform 42, 44 thermally uncouple each adjacent nozzle segments 40 (FIG. 3). That is, the temperature environment of the turbine section 18 and the substantial aerodynamic and thermal loads are accommodated by the plurality of circumferentially adjoining nozzle segments 40 which collectively form a full, annular ring about the centerline axis A of the engine (FIG. 4). Although a nozzle segment 40 for a turbine nozzle are illustrated in the disclosed embodiment, it should be understood that other nozzle sections such as compressor nozzle sections may also benefit herefrom.

Each nozzle segment 40 may include one or more circumferentially spaced turbine vanes 50 which extend radially between the vane platforms 42, 44. That is, the full, annular nozzle ring formed by the multiple of nozzle segments 40 provide the stator portion 36 of one stage in the turbine section 18.

Figure 5:
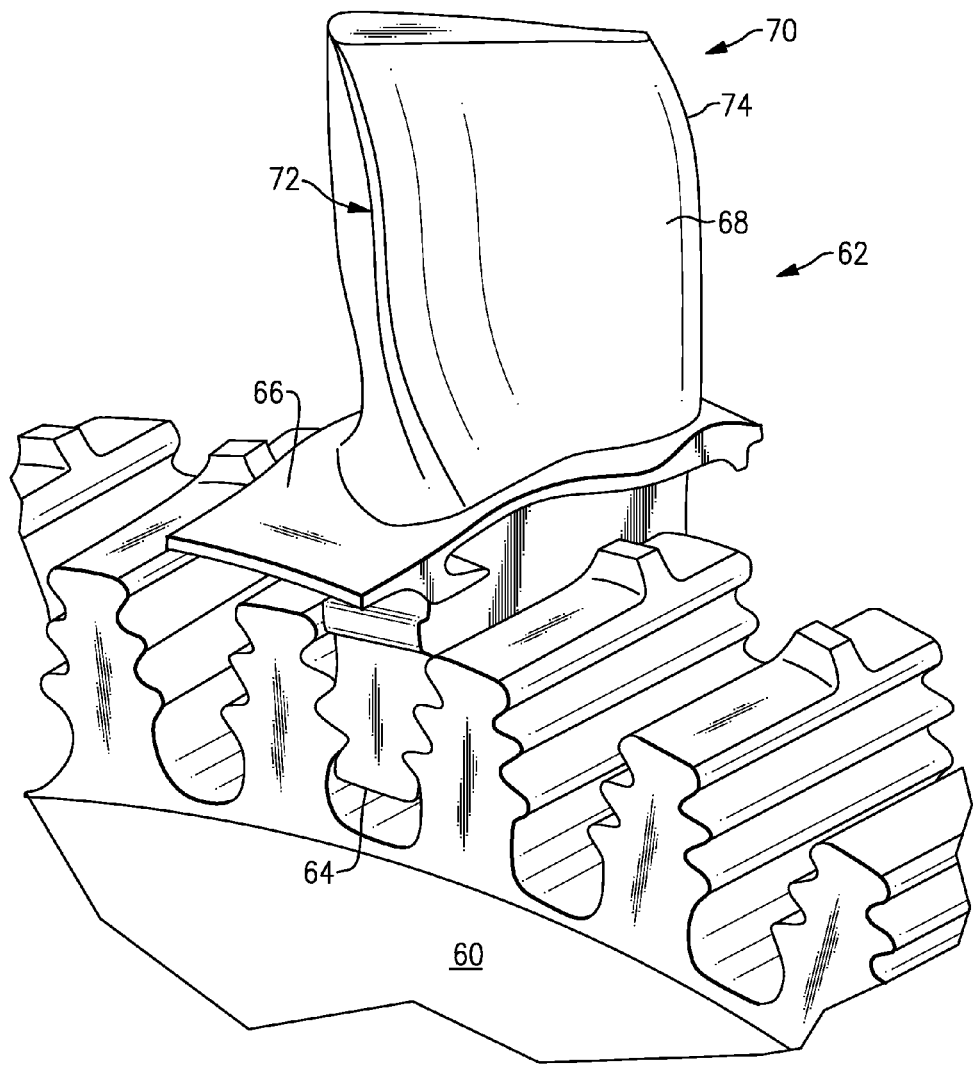
FIG. 5 is an expanded perspective view of a turbine rotor section.

The rotor portion 38 generally includes a rotor disk 60 which receives a multiple of rotor blades 62 (also illustrated in FIG. 5). Each rotor blade 62 includes a blade root section 64, a blade platform section 66, and a blade airfoil section 68, the blade platform section 66 between the blade root section 64 and the blade airfoil section 68. The blade root section 64 is fit into a corresponding slot of the turbine rotor disk 60. The blade airfoil section 68 is defined by an outer airfoil surface 70 between a leading edge 72 and a trailing edge 74.

Typically, cooling air is directed to the interiors of both the turbine vanes 50 and blade airfoil section 68 in a conventional manner. The cooling air provides internal and film cooling. Since the stator portion 36 is static relative the rotor portion 38, a clearance gap 80 is necessarily provided therebetween. The gap 80 is arranged to be as small as possible in order to minimize the hot combustion products H which may flow through the gap 80 and negatively effect the static structure 48 and the rotor disk 60.

The hot combustion products H flow along the turbine vanes 50 and the blade airfoil section 68 within radial inner and outer annular boundaries defined by the vane platforms 42, 44, the blade platform section 66 and an outer static structure 82 outboard of the rotor blades 62. The relatively cooler high pressure purge airflow P pressurizes the cavity under the inner vane platform 44 and under the blade platform section 66. The inner vane platform 44 and the blade platform section 66 are typically at least partially overlapped in the axial flow direction of the hot combustion products H.

Although tight tolerances are maintained at the gap 80, variation occurs axially as the engine 10 expands and contracts over typical engine operating cycles. The purge airflow P exits through the gap 80 in a radially outward direction as indicated by the arrows. The pressure of the purge airflow P outward through the gap 80 is higher than the highest pressure of the hot combustion products H to prevent the hot combustion products H from a negative effect upon the static structure 48 and the rotor disk 60.

The static pressure of the hot combustion products H in the core flow path conventionally varies circumferentially. The purge airflow P may cause inefficiencies in proportion to the non-axisymmetric pressure fields of the hot combustion products H which may have circumferentially non-uniform flow fields adjacent the gaps 80. Were the hot combustion products H flow fields to have perfectly uniform pressures in the circumferential direction, the necessity for the purge airflow P would be essentially eliminated.

The inner vane platform 44 and the blade platform section 66 disclosed herein provide non-axisymmetric surface features to a leading portion 44L, 66L, a trailing portion 44T, 66T and various combinations thereof to counteract the non-uniform (circumferentially) static-pressure distortions engendered by hot combustion products H to reduce purge-flow requirements and also reduce aerodynamic losses.

Figure 6:
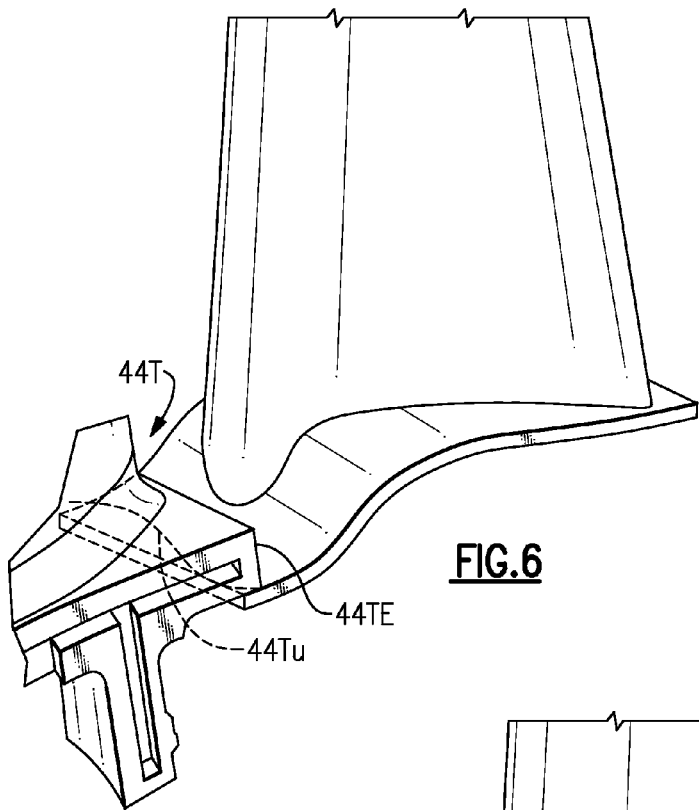
FIG. 6 is a schematic view of an inner vane platform with an radial non-axisymmetric surface contour.

Referring to FIG. 3, the trailing portion 44T is contoured in a radial direction on an undersurface 44T-L. The undersurface 44T-L may, in one non-limiting embodiment, be contoured to provide a non-axisymmetric surface such as a waveform surface (FIG. 6). As will be appreciated from FIGS. 3, 6-10 and 12, the waveform surfaces of the various examples are curved, or curved waveform surfaces. An upper surface 44Tu of the trailing portion 44T may define a conventional axisymmetric surface. Alternatively, or in addition thereto, the undersurface 44L-L of the leading portion 44L may also be so contoured in a radial direction.

Figure 7:
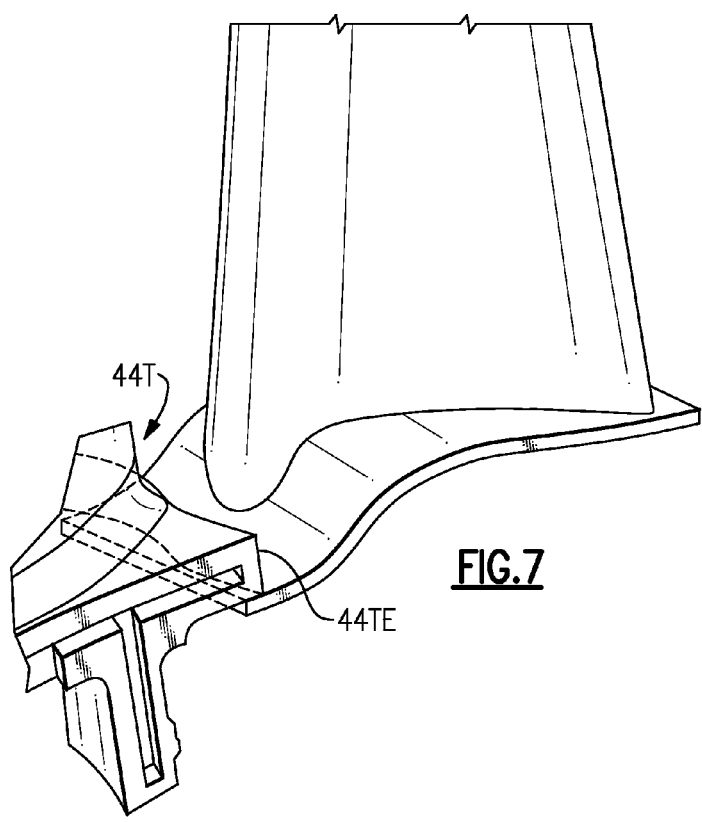

The trailing portion 44T may also be contoured in an axial direction on a trailing edge 44TE. The trailing edge 44TE may, in one non-limiting embodiment, be contoured to provide a non-axisymmetric surface such as a waveform surface (FIG. 7). Alternatively, or in addition thereto, a leading edge 44LE may also be so contoured in an axial direction (FIG. 7).

It should be understood that the non-axisymmetric radial surface contour undersurface 44T-L of the trailing portion 44T, the non-axisymmetric radial surface contour undersurface 44L-L of the leading portion 44L, the non-axisymmetric axial surface contour of the trailing edge 44TE, and the non-axisymmetric axial surface contour of the leading edge 44LE may be combined in various manners in relation to the hot combustion products H to reduce purge-flow requirements and also reduce aerodynamic losses. For example, the non-axisymmetric radial surface contour undersurface 44T-L of the trailing portion 44T, the non-axisymmetric radial surface contour undersurface 44L-L of the leading portion 44L, the non-axisymmetric axial surface contour of the trailing edge 44TE, and the non-axisymmetric axial surface contour of the leading edge 44LE may all be utilized together.

Figure 8:
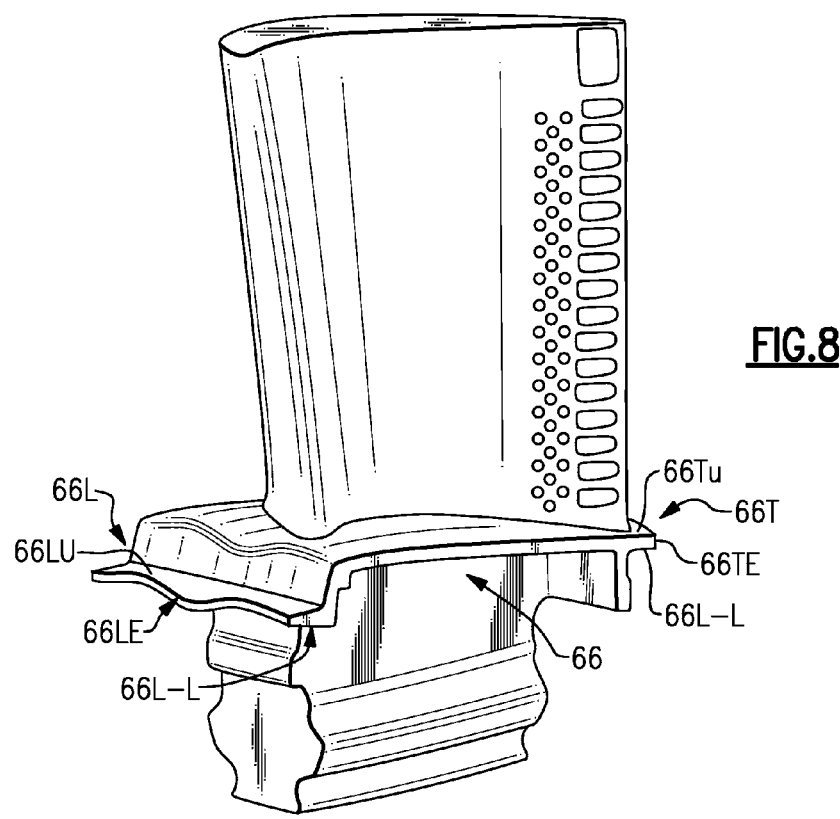
FIG. 8 is a perspective view of a turbine rotor blade.
Figure 9:
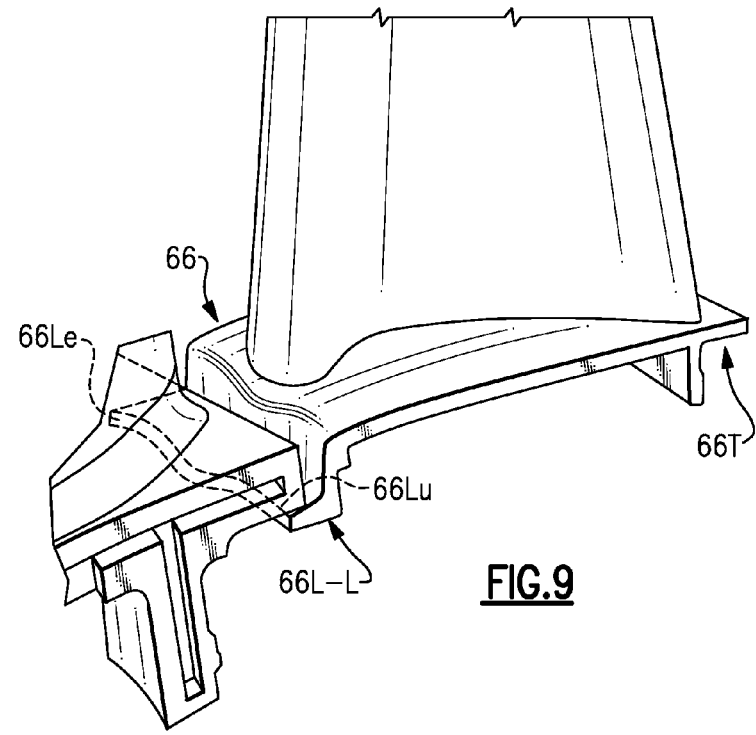
FIG. 9 is a schematic view of a rotor blade with a radial non-axi-symmetric surface contour on a platform thereof.
Figure 10:
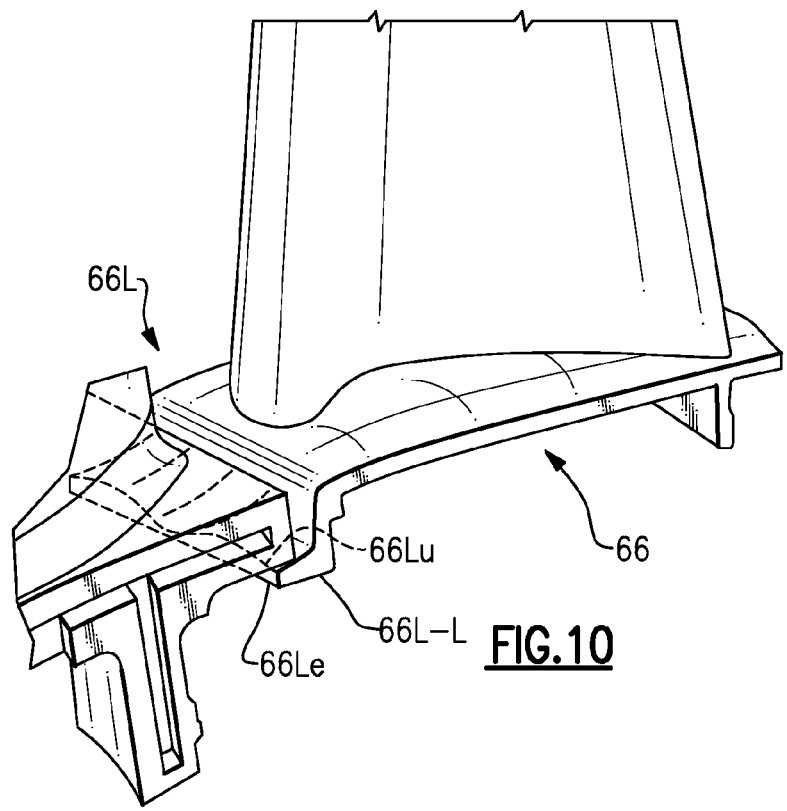
FIG. 10 is a schematic view of another embodiment of a rotor blade with a radial non-axi-symmetric surface contour on a platform trailing edge.
Figure 11:
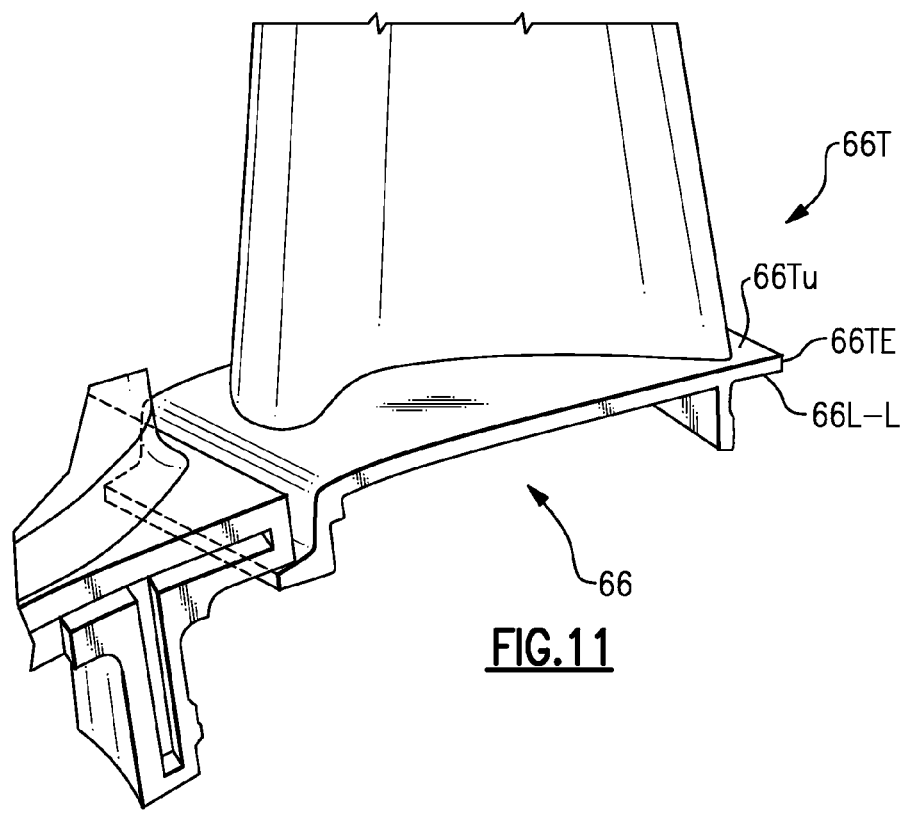
FIG. 11 is a schematic view of a stator vane portion with an axial non-axisymmetric surface contour on a platform trailing edge.

Referring to FIG. 8, the leading portion 66L of the blade platform section 66 may be contoured in a radial direction. The leading edge 66LE may, alternatively or additionally, be contoured to provide an axial non-axisymmetric surface such as a waveform surface (FIG. 9). In this non-limiting embodiment, the entire platform leading edge 66LE forms the wavelike shape. A lower surface 66L-L and or the upper surface 66Lu of the leading portion 66L may define ether a conventional axisymmetric surface or be contoured to provide a non-axisymmetric surface such as a waveform surface (FIG. 10). Alternatively, or in addition thereto, the undersurface 66T-L of the trailing portion 66T may also be so contoured in a radial direction (FIG. 11). As will be appreciated from FIGS. 3, 6-10 and 12, the leading portion 44L, 66L and the trailing portion 44T of the various examples are, respectively, completely axially forward of the blade airfoil section 68 and axially aft of the blade airfoil section 68.

Figure 12:
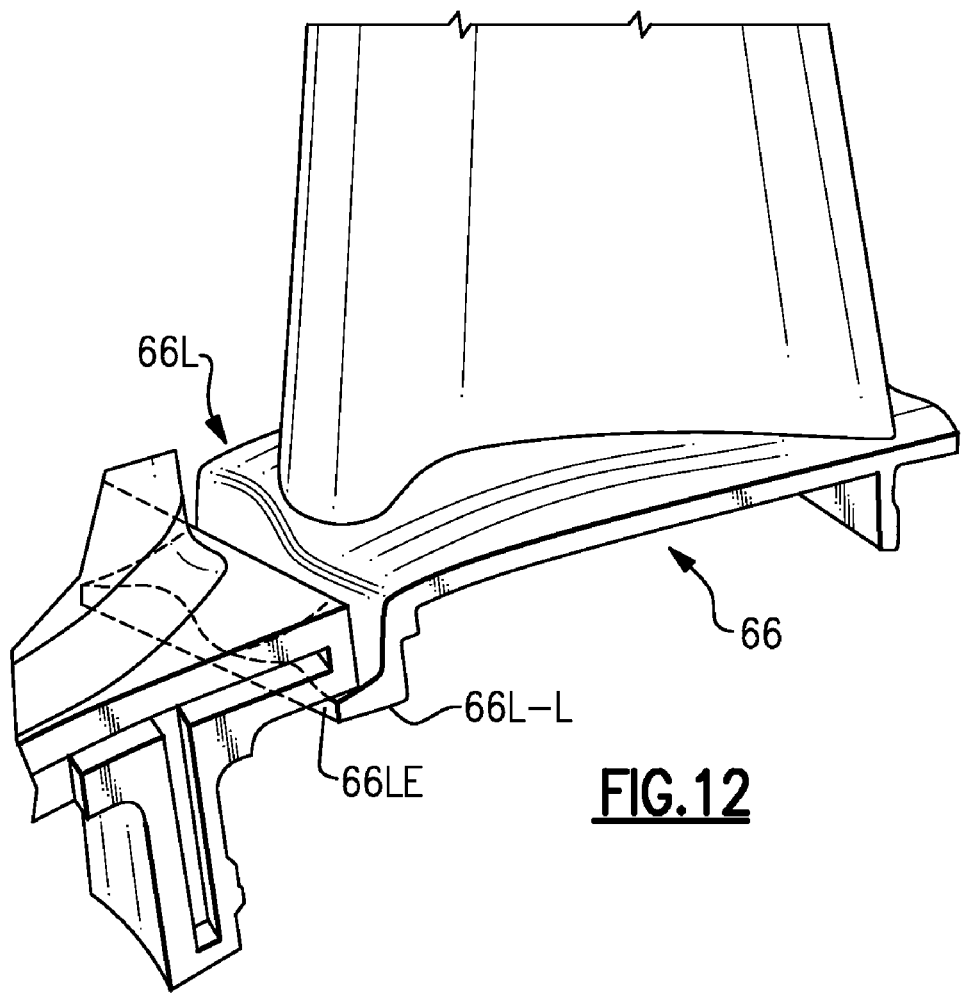
FIG. 12 is a schematic view of a stator vane portion with an axial non-axisymmetric surface contour on a platform leading edge.

Referring to FIG. 12, the leading portion 66L may also be contoured in an axial direction on a leading edge 66LE. The leading edge 66LE may, in one non-limiting embodiment, be contoured to provide a non-axisymmetric surface such as a waveform surface. Alternatively, or in addition thereto, the trailing edge portion 66TE may be contoured in an axial direction to provide a non-axisymmetric surface such as a waveform surface.

It should be understood that the non-axisymmetric radial surface contour undersurface 62T-L of the trailing portion 62T, the non-axisymmetric radial surface contour undersurface 66L-L of the leading portion 66L, the non-axisymmetric axial surface contour of the trailing edge 66TE, and the non-axisymmetric axial surface contour of the leading edge 66LE may be combined in various manners in relation to the hot combustion products to reduce purge-flow requirements and also reduce aerodynamic losses. Furthermore, features of the non-axisymmetric radial and/or axial surface contour of the blade platform section 66 and features of the non-axisymmetric radial and/or axial surface contour of the inner vane platform 44 may be combined in various manners to further reduce purge-flow requirements and aerodynamic losses.

It should be understood that relative positional terms such as "forward," "aft," "upper," "lower," "above," "below," and

What is claimed is:

1. A vane segment for a gas turbine engine comprising:
   an outer vane platform relative an axis;
   an inner vane platform relative said axis, said inner vane platform having a non-axisymmetric surface contour adjacent at least one of a trailing edge and a leading edge of said inner vane platform; and
   a vane which extends between said outer vane platform and said inner vane platform;
   wherein said non-axisymmetric surface contour includes a waveform surface, and said waveform surface is curved.

2. The vane segment as recited in claim 1, wherein said vane is a turbine vane.

3. The vane segment as recited in claim 1, wherein said non-axisymmetric surface contour is located on an undersurface of said inner vane platform.

4. The vane segment as recited in claim 3, wherein said non-axisymmetric surface contour is located adjacent said trailing edge of said inner vane platform.

5. The vane segment as recited in claim 4, wherein said non-axisymmetric surface contour is contoured in a radial direction.

6. The vane segment as recited in claim 3, wherein said non-axisymmetric surface contour is located adjacent said leading edge of said inner vane platform.

7. The vane segment as recited in claim 6, wherein said non-axisymmetric surface contour is contoured in a radial direction.

8. The vane segment as recited in claim 3, wherein an upper surface of said inner vane platform is axisymmetric.

9. The vane segment as recited in claim 8, wherein said non-axisymmetric surface contour is contoured in a radial direction.

10. The vane segment as recited in claim 1, wherein said non-axisymmetric surface contour is located along said trailing edge of said inner vane platform.

11. The vane segment as recited in claim 10, wherein said non-axisymmetric surface contour is contoured in an axial direction.

12. The vane segment as recited in claim 1, wherein said non-axisymmetric surface contour is located along said leading edge of said inner vane platform.

13. The vane segment as recited in claim 12, wherein said non-axisymmetric surface contour is contoured in an axial direction.

14. The vane segment as recited in claim 1, wherein said waveform surface extends along an entire span of said leading edge.

15. The vane segment as recited in claim 1, wherein said waveform surface extends along an entire span of said trailing edge.

16. The vane segment as recited in claim 1, wherein said waveform surface is located adjacent said leading edge, and said leading edge is completely axially forward of said vane.

17. The vane segment as recited in claim 1, wherein said waveform surface is located adjacent said trailing edge, and said trailing edge is completely axially aft of said vane.

18. A gas turbine engine comprising:
    optionally, a fan;
    a compressor section;
    a combustor in fluid communication with the compressor section; and
    a turbine section in fluid communication with the combustor, the compressor section and the fan being coupled to rotate with the turbine section about an engine axis, and
    at least one of the fan, the compressor section and the turbine section including an airfoil comprising an inner platform relative to said axis, said inner platform including a curved waveform surface located along at least one of a trailing edge and a leading edge of said inner platform.

* * * * *